(12) United States Patent
Kim et al.

(10) Patent No.: US 11,815,741 B2
(45) Date of Patent: Nov. 14, 2023

(54) IMAGE CAPTURING LENS SYSTEM

(71) Applicant: SAMSUNG ELECTRO-MECHANICS CO., LTD., Suwon-si (KR)

(72) Inventors: Hyuk Joo Kim, Suwon-si (KR); Hwan Soo Park, Suwon-si (KR); Yong Joo Jo, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 794 days.

(21) Appl. No.: 16/562,035

(22) Filed: Sep. 5, 2019

(65) Prior Publication Data
US 2020/0209543 A1   Jul. 2, 2020

(30) Foreign Application Priority Data

Jan. 2, 2019   (KR) .................... 10-2019-0000280

(51) Int. Cl.
| | |
|---|---|
| G02B 13/04 | (2006.01) |
| G02B 9/64 | (2006.01) |
| G02B 1/04 | (2006.01) |
| G02B 7/02 | (2021.01) |

(52) U.S. Cl.
CPC ............... *G02B 9/64* (2013.01); *G02B 1/041* (2013.01); *G02B 7/028* (2013.01)

(58) Field of Classification Search
CPC ... G02B 9/64; G02B 13/0045; G02B 13/0015
See application file for complete search history.

(56) References Cited

U.S. PATENT DOCUMENTS

| | | | | |
|---|---|---|---|---|
| 3,982,823 | A | * 9/1976 | Momiyama | G02B 13/04 359/740 |
| 2009/0002849 | A1 | * 1/2009 | Kim | G02B 13/06 359/749 |
| 2009/0052055 | A1 | * 2/2009 | Lin | G02B 9/64 359/764 |

(Continued)

FOREIGN PATENT DOCUMENTS

| | | |
|---|---|---|
| CN | 101373259 A | 2/2009 |
| CN | 102707418 A | 10/2012 |

(Continued)

OTHER PUBLICATIONS

Chinese Office Action dated May 31, 2022, in counterpart Chinese Patent Application No. 201911225282.4 (14 pages in English and 12 pages in Chinese).

*Primary Examiner* — Joseph P Martinez
(74) *Attorney, Agent, or Firm* — NSIP Law

(57) ABSTRACT

An image capturing lens system includes a first lens having negative refractive power, a second lens having positive refractive power, a third lens having negative refractive power, a fourth lens having positive refractive power, a fifth lens having refractive power, a sixth lens having refractive power, a seventh lens having positive refractive power, and an eighth lens having refractive power. The first to eighth lenses are sequentially disposed from an object side. The first lens and the fourth lens are formed of a glass material. The second lens, the third lens, the fifth lens, the sixth lens, the seventh lens, and the eighth lens are formed of a plastic material.

15 Claims, 5 Drawing Sheets

(56) References Cited

U.S. PATENT DOCUMENTS

| | | | |
|---|---|---|---|
| 2011/0019289 A1* | 1/2011 | Kawakami | G02B 15/143503 |
| | | | 359/689 |
| 2015/0168693 A1 | 6/2015 | Sun et al. | |
| 2017/0254990 A1 | 9/2017 | Noda et al. | |
| 2018/0172960 A1 | 6/2018 | Park et al. | |
| 2018/0203207 A1 | 7/2018 | Chen et al. | |
| 2018/0239117 A1* | 8/2018 | Lee | G02B 13/0045 |
| 2018/0348491 A1 | 12/2018 | Lee | |
| 2018/0372998 A1* | 12/2018 | Pao | G02B 13/0045 |
| 2020/0301106 A1* | 9/2020 | Jung | G02B 13/002 |

FOREIGN PATENT DOCUMENTS

| | | |
|---|---|---|
| CN | 104583833 A | 4/2015 |
| CN | 105607234 A | 5/2016 |
| CN | 108983400 A | 12/2018 |
| JP | 2014-16574 A | 1/2014 |
| JP | 2017-161569 A | 9/2017 |
| KR | 10-2018-0072355 A | 6/2018 |

\* cited by examiner

IMAGE CAPTURING LENS SYSTEM

CROSS-REFERENCE TO RELATED APPLICATION

This application claims the benefit under 35 USC 119(a) of Korean Patent Application No. 10-2019-0000280 filed on Jan. 2, 2019 in the Korean Intellectual Property Office, the entire disclosure of which is incorporated herein by reference for all purposes.

BACKGROUND

1. Field

The following description relates to an image capturing lens system which may implement constant optical performance irrespective of temperature variations in a surrounding environment.

2. Description of Background

A small-sized surveillance camera is configured to capture image information in a surveillance area. For example, such a small-sized surveillance camera may be mounted on each of front and rear bumpers, or the like, of a vehicle, to provide captured images to a driver.

Since an early small-size surveillance camera was configured to capture a nearby obstacle adjacent to a vehicle, the surveillance camera had a relatively low resolution and the resolution of the surveillance significantly varied depending on temperature variations of −40 to 80 degrees Celsius. However, as autonomous driving functions of vehicles are increasingly required, there is a need for development of a surveillance camera, having a high resolution of 12 megapixels or more and constant optical characteristics even in extreme temperature conditions, and an image capturing lens system appropriate for a surveillance camera.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an image capturing lens system includes a first lens, a second lens, a third lens, a fourth lens, a fifth lens, a sixth lens, a seventh lens, and an eighth lens sequentially disposed from an object side of the image capturing lens system. The first lens and the fourth lens are formed of a glass material, and the second lens, the third lens, the fifth lens, the sixth lens, the seventh lens, and the eighth lens are formed of a plastic material.

The second lens may have a concave object-side surface.
The second lens may have a convex image-side surface.
The eighth lens may have a convex object-side surface.
The eighth lens may have a concave image-side surface.
The second lens may have positive refractive power.
The eighth lens may have positive refractive power.
The sixth lens may have a refractive index less than 1.7.
The first lens may have an Abbe number greater than 40, and the third lens may have an Abbe number less than 30.

In another general aspect, an image capturing lens system includes a first lens having negative refractive power, a second lens having positive refractive power, a third lens having negative refractive power, a fourth lens having positive refractive power, a fifth lens having refractive power, a sixth lens having refractive power, a seventh lens having positive refractive power, and an eighth lens having refractive power. The first to eighth lenses are sequentially disposed from an object side.

The third lens may have a convex image-side surface.
The fifth lens may have a convex object-side surface or a convex image-side surface.
The sixth lens may include a concave object-side surface or a concave image-side surface.
The seventh lens may have a concave image-side surface.
The eighth lens may have a concave image-side surface.
The image capturing lens system may include a stop including an opening and the stop may be disposed between the fourth lens and the fifth lens, and a size of the opening may be controlled to adjust an intensity of light incident on a side of the fifth lens.

In another general aspect, an image capturing lens system includes a first lens group including a first lens, a second lens, a third lens, and a fourth lens sequentially disposed from an object side of the image capturing lens system; and a second lens group comprising a fifth lens, a sixth lens, a seventh lens, and an eighth lens sequentially disposed from the object side of the image capturing lens system. At least one of the lenses of the first lens group is formed of a glass material and all of the lenses of the second lens group are formed of a plastic material.

The image capturing lens system may include a stop disposed between the first lens group and the second lens group.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
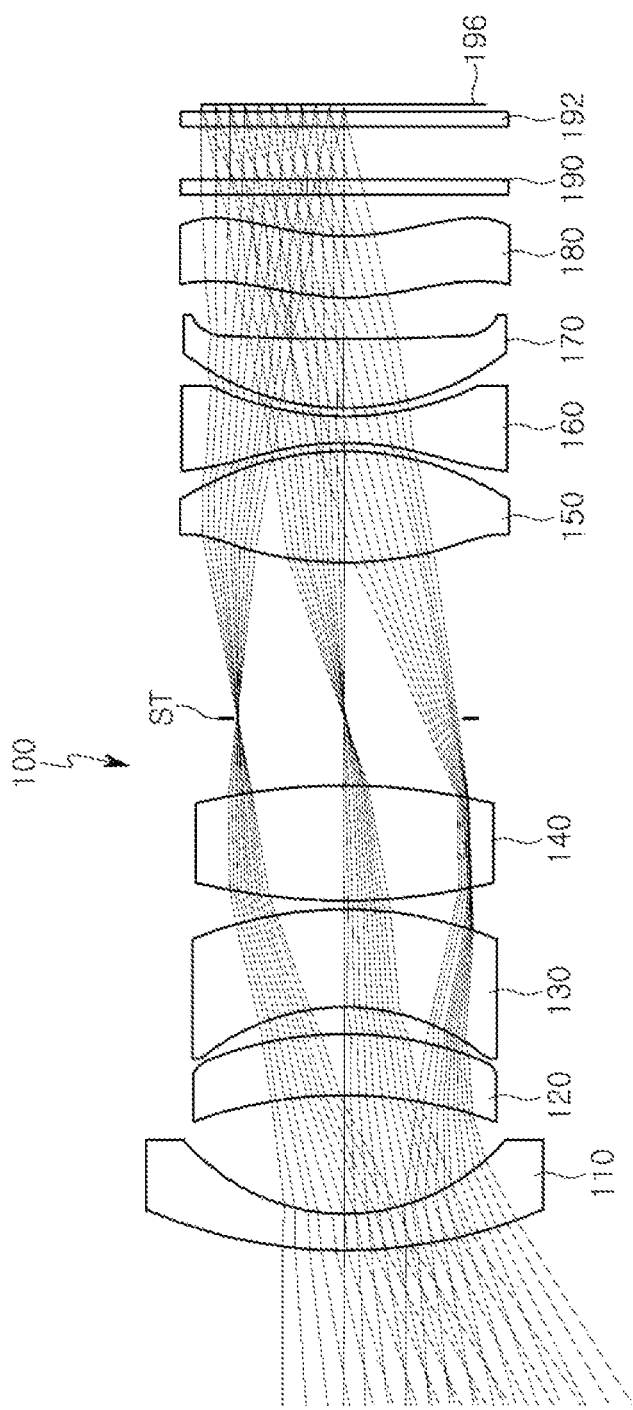
FIG. 1 illustrates a configuration of an image capturing lens system according to a first example.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Hereinafter, examples of the present disclosure will be described as follows with reference to the attached drawings.

In the examples, an entirety of a radius of curvature, a thickness, and a focal length of a lens are indicated in millimeters (mm). Further, a thickness of a lens, and a gap between lenses are distances measured based on an optical axis of the lens.

In a description of a form of a lens, a surface of a lens being convex indicates that an optical axis region of a corresponding surface is convex, while a surface of a lens being concave indicates that an optical axis region of a corresponding surface is concave. Therefore, in a configuration in which a surface of a lens is described as being convex, an edge portion of the lens may be concave. In a similar manner, in a configuration in which a surface of a lens is described as being concave, an edge portion of the lens may be convex.

An image capturing lens system may include a plurality of lenses. For example, the image capturing lens system may include eight lenses. The image capturing lens system may be divided into a plurality of lens groups. For example, the image capturing lens system may be divided into a first lens group, disposed in front of a stop, and a second lens group disposed in back of the stop. The first lens group includes four lenses (first to fourth lenses), and includes one or more lenses formed of glass. For example, the first lens and the fourth lens of the first lens group may be formed of glass. The second lens group includes four lenses (fifth to eighth lenses), and may include only lenses formed of glass. In the descriptions below, the first to eighth lenses of the image capturing lens system will be described.

The first lens may have refractive power. For example, the first lens may have negative refractive power.

The first lens may have a convex surface. For example, the first lens may have a convex object-side surface.

The first lens may be formed of a material having high light transmissivity and low thermal deformation. For example, the first lens may be formed of a glass material.

The first lens may have a predetermined refractive index. For example, the first lens may have a refractive index of 1.7 or higher. The first lens may have a predetermined Abbe number. For example, the first lens may have an Abbe number greater than 40.

The second lens may have refractive power. For example, the second lens may have positive or negative refractive power.

The second lens may have a concave surface. For example, the second lens may have a concave object-side surface.

The second lens may include a spherical surface. For example, both surfaces of the second lens may be spherical. The second lens may be formed of a material having a constant refractive index irrespective of temperature change. For example, the second lens may be formed of a glass material.

The second lens may have a predetermined refractive index. For example, the second lens may have a refractive index less than 1.6. The second lens may have a predetermined Abbe number. For example, the second lens may have an Abbe number greater than the Abbe number of the first lenses.

The third lens may have refractive power. For example, the third lens may have negative refractive power.

The third lens may have a convex surface. For example, the third lens may have a convex object-side surface.

The third lens may be formed of a material having high light transmissivity and improved workability. For example, the third lens may be formed of a glass material.

The third lens may have a predetermined refractive index. For example, the third lens may have a refractive index of 1.60 or more. The third lens may have a predetermined Abbe number. For example, the third lens may have an Abbe number lower the first lenses. For example, the third lens may have an Abbe number less than 30.

The fourth lens may have refractive power. For example, the fourth lens may have positive refractive power.

The fourth lens may have at least one convex surface. For example, the fourth lens may have a concave object-side surface or a concave image-side surface, or may have a concave object-side surface and a concave image-side surface.

The fourth lens may be formed of a material having high light transmissivity and low thermal deformation. For example, the fourth lens may be formed of a glass material.

The fourth lens may have a predetermined refractive index. For example, the fourth lens may have a refractive index of 1.7 or higher. The fourth lens may have an Abbe number greater than the Abbe number of the third lens. For example, the fourth lens may have an Abbe number of 40 or more.

The fifth lens may have refractive power. The fifth lens may have at least one convex surface. For example, the fifth lens may have a concave object-side surface or a concave image-side surface, or may have a concave object-side surface and a concave image-side surface.

The fifth lens may be formed of a material having high light transmissivity and low manufacturing costs. For example, the fifth lens may be formed of a plastic material.

The fifth lens may have a predetermined refractive index. For example, the fifth lens may have a refractive index less than 1.6. The fifth lens may have a greater Abbe number than adjacent lenses (the fourth lens and the sixth lens).

The sixth lens may have refractive power. The sixth lens may have at least one concave surface. For example, the sixth lens may have a concave object-side surface or a concave image-side surface, or may have a concave object-side surface and a concave image-side surface.

The sixth lens may be formed of a material having high light transmissivity and low manufacturing costs. For example, the sixth lens may be formed of a plastic material.

The sixth lens may have a predetermined refractive index. For example, the sixth lens may have a refractive index of 1.6 or more. The sixth lens may have a predetermined Abbe number. For example, the sixth lens have a smaller Abbe number than adjacent lenses (the fifth lens and the seventh lens).

The seventh lens may have refractive power. For example, the seventh lens may have positive refractive power.

The seventh lens may have a convex surface. For example, the seventh lens may have a convex object-side surface or a convex image-side surface.

The seventh lens may be formed of a material having high light transmissivity and low manufacturing costs. For example, the seventh lens may be formed of a plastic material.

The seventh lens may have a predetermined refractive index. For example, the seventh lens may have a refractive index less than 1.6. The seventh lens may have an Abbe number greater than the Abbe number of the sixth lens. For example, the seventh lens may have an Abbe number of 50 or more.

The eighth lens may have refractive power. The eighth lens may have a concave surface. For example, the eighth lens may have a concave image-side surface. The eighth lens may have a shape including an inflection point. For example, an inflection point is formed on at least one of an object-side surface and an image-side surface of the eighth lens.

The eighth lens may be formed of a material having high light transmissivity and low manufacturing costs. For example, the eighth lens may be formed of a plastic material.

The eighth lens may have a predetermined refractive index. For example, the eighth lens may have a refractive index less than 1.6. The eighth lens may have an Abbe number greater than the Abbe number of the sixth lens. For example, the eighth lens may have an Abbe number of 50 or more.

An image capturing lens system includes an image sensor. The image sensor may be configured to implement high resolution. A surface of the image sensor may form an imaging plane on which an image is formed.

The image capturing lens system includes a stop. The stop may be disposed between a lens, formed of a glass material, and a lens formed of a plastic material. For example, the stop may be disposed between the fourth lens and the fifth lens, and a location of the stop is not limited thereto. The stop may be configured to adjust an opening size. For example, the stop may be fully opened to allow all of light, incident from an object side, to pass through, or may be partially opened to allow a part of the incident light to pass through. The image capturing lens system may have F No. of 1.6 to 4.2. The stop may adjust the intensity of light, incident on the image sensor, and may reduce resolution degradation caused by thermal deformation of a plastic lens.

The image capturing lens system includes a plurality of filters. For example, the image capturing lens system may include a first filter, configured to block foreign objects, and a second filter configured to block infrared light. The first filter and the second filter may change in function.

The image capturing lens system includes a plurality of lenses, formed of plastic, to reduce manufacturing costs. In addition, the image capturing lens system may include two or more lenses, formed of glass, to reduce resolution degradation caused by thermal deformation of the plastic lens. The above-configured image capturing lens system may be employed in a surveillance camera of a vehicle as well as a camera, requiring a wide viewing angle, such as a surveillance camera for a drone.

The image capturing lens system is configured to satisfy at least one of Conditional Expressions below.

| Conditional Expression 1 | F No. < 1.7 |
| --- | --- |
| Conditional Expression 2 | $Nd6 < 1.7$ |
| Conditional Expression 3 | $1.7 < (Nd1 + Nd4)/2$ |
| Conditional Expression 4 | $(Nd5 + Nd6 + Nd7 + Nd8)/4 < 1.6$ |
| Conditional Expression 5 | $40 < V1$ |
| Conditional Expression 6 | $V3 < 30$ |
| Conditional Expression 7 | $V2-V1 < 10$ |

-continued

| Conditional Expression 8 | 30 < V2−V3 |
| Conditional Expression 9 | D23 < D12 |
| Conditional Expression 10 | 4 < D45/D23 < 10 |

In the Conditional Expressions, Nd1 is a refractive index of the first lens, Nd4 is a refractive index of the fourth lens, Nd5 is a refractive index of the fifth lens, Nd6 is a refractive index of the sixth lens, Nd7 is a refractive index of the seventh lens, Nd8 is a refractive index of the eighth lens, V1 is an Abbe number of the first lens, V2 is an Abbe lens of the second lens, V3 is an Abbe lens of the third lens, D12 is a distance from an image-side surface of the first lens to an object-side surface of the second lens, D23 is a distance from an image-side surface of the second lens to an object-side surface of the third lens, and D45 is a distance from an image-side surface of the fourth lens to an object-side surface of the fifth lens.

Hereinafter, an image capturing lens system according to an example will be described below.

An image capturing lens system 100 according to a first example will now be described with reference to FIG. 1.

The image capturing lens system 100 includes a plurality of lenses, each having a refractive index. For example, the image capturing lens system includes a first lens 110, a second lens 120, a third lens 130, a fourth lens 140, a fifth lens 150, a sixth lens 160, a seventh lens 170, and an eighth lens 180.

The first lens 110 has negative refractive power, and has a convex object-side surface and a concave image-side surface. The second lens 120 has positive refractive power, and has a concave object-side surface and a convex image-side surface. The third lens 130 has negative refractive power, and has a concave object-side surface and a convex image-side surface. The fourth lens 140 has positive refractive power, and has a convex object-side surface and a convex image-side surface. The fifth lens 150 has positive refractive power, and has a convex object-side surface and a convex image-side surface. The sixth lens 160 has negative refractive power, and has a concave object-side surface and a concave image-side surface. The seventh lens 170 has positive refractive power, and has a convex object-side surface and a concave image-side surface. The eighth lens 180 has positive refractive power, and has a convex object-side surface and a concave image-side surface. Inflection points are formed on the object-side surface and the image-side surface of the eighth lens 180.

The image capturing lens system 100 includes a lens, formed of a glass material, to perform optical performance in spite of temperature variations depending on an external environment. In the example of FIG. 1, the first lens 110 and the fourth lens 140 are formed of a glass material. Moreover, the image capturing lens system 100 includes a plurality of plastic lenses to reduce manufacturing costs and lighten product weight. In the example of FIG. 1, the second lens 120, the third lens 130, and the fifth lens 150 to the eighth lens 180 are formed of a plastic material.

The image capturing lens system 100 includes a stop ST. The stop ST is disposed between the fourth lens 140 and the fifth lens 150. The image capturing lens system 100 includes filters 190 and 192 disposed between the eighth lens 180 and an imaging plane 196. The filters 190 and 192 may block infrared light and prevent contamination of the imaging plane caused by foreign objects.

The image capturing lens system 100 may have a predetermined field of view (FOV). For example, an overall FOV of the image capturing lens system 100 is 64.09 degrees. An F No. of the image capturing lens system 100 is 1.640. A total length TL of the image capturing lens system 100 is 28.50 mm.

Table (1) lists lens characteristics of the image capturing lens system 100.

TABLE 1

| Surface No. | Note | Radius of Curvature | Thickness/ Distance | Refractive Index | Abbe No. | Focal Length |
|---|---|---|---|---|---|---|
| 1 | First | 12.0000 | 0.9093 | 1.772 | 49.0 | −12.5890 |
| 2 | Lens | 5.1925 | 2.9845 | | | |
| 3 | Second | −7.8568 | 1.5000 | 1.534 | 56.0 | 125.1128 |
| 4 | Lens | −7.4973 | 0.6600 | | | |
| 5 | Third | −5.0526 | 2.4164 | 1.640 | 23.0 | −23.8359 |
| 6 | Lens | −8.9647 | 0.2000 | | | |
| 7 | Fourth | 14.3363 | 2.9000 | 1.772 | 49.0 | 9.9226 |
| 8 | Lens | −15.0000 | 1.7000 | | | |
| 9 | Stop | Infinity | 3.8760 | | | |
| 10 | Fifth | 8.7221 | 2.8000 | 1.534 | 56.0 | 8.5471 |
| 11 | Lens | −8.5043 | 0.2000 | | | |
| 12 | Sixth | −5.5859 | 0.6500 | 1.640 | 23.0 | −6.4568 |
| 13 | Lens | 16.6008 | 0.2000 | | | |
| 14 | Seventh | 5.7327 | 1.7056 | 1.534 | 56.0 | 15.2007 |
| 15 | Lens | 17.4935 | 1.0310 | | | |
| 16 | Eighth | 4.7268 | 1.5433 | 1.534 | 56.0 | 72.4898 |
| 17 | Lens | 4.7723 | 1.0201 | | | |
| 18 | First | Infinity | 0.4000 | 1.517 | 64.0 | |
| 19 | Filter | Infinity | 1.3000 | | | |
| 20 | Second | Infinity | 0.4000 | 1.517 | 64.0 | |
| 21 | Filter | Infinity | 0.1007 | | | |
| 22 | Imaging Plane | Infinity | 0.0031 | | | |

Figure 2:
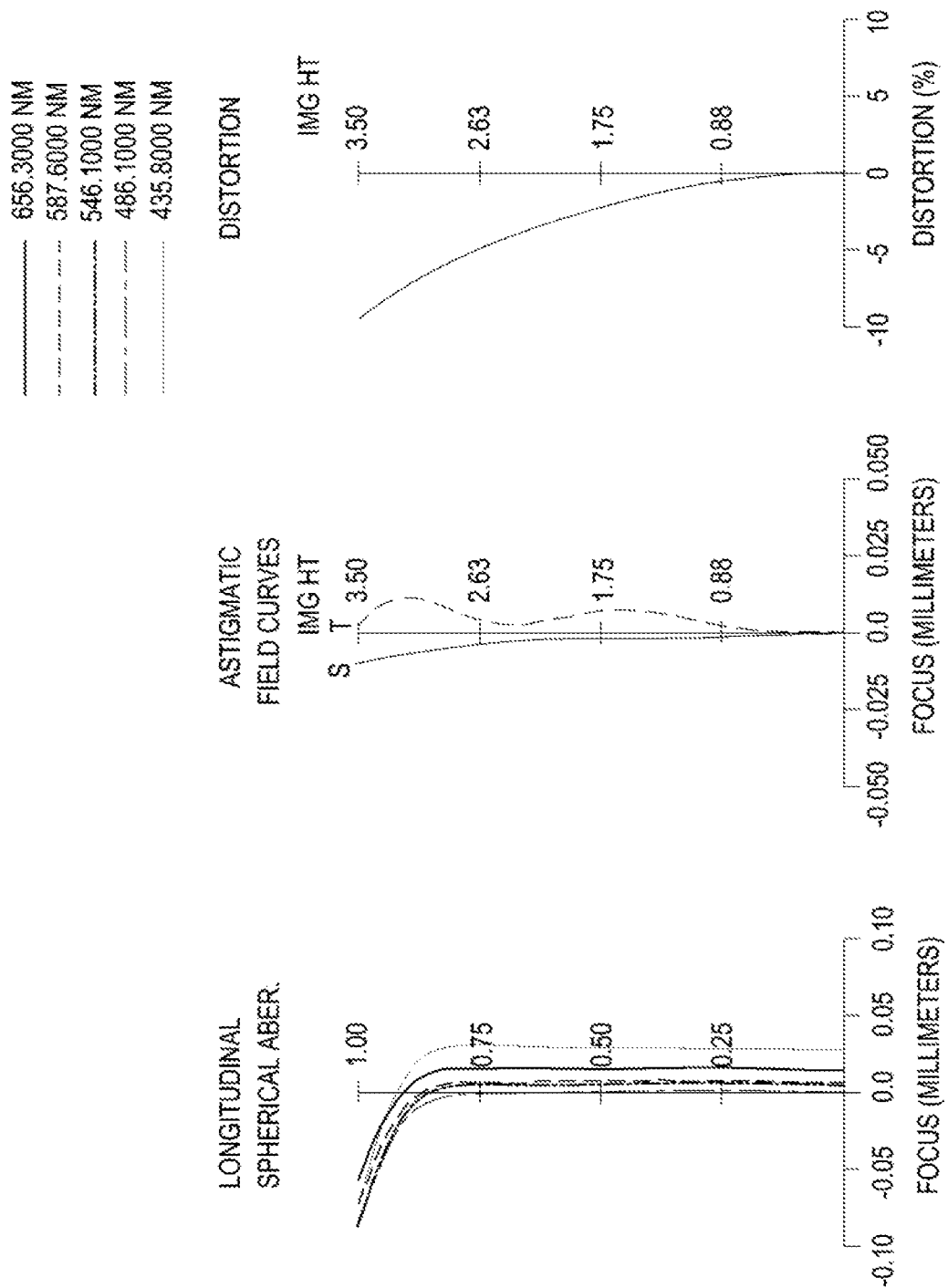
FIG. 2 shows aberration curves of the image capturing lens system illustrated in FIG. 1.

FIG. 2 illustrates aberration curves of the image capturing lens system 100.

Figure 3:
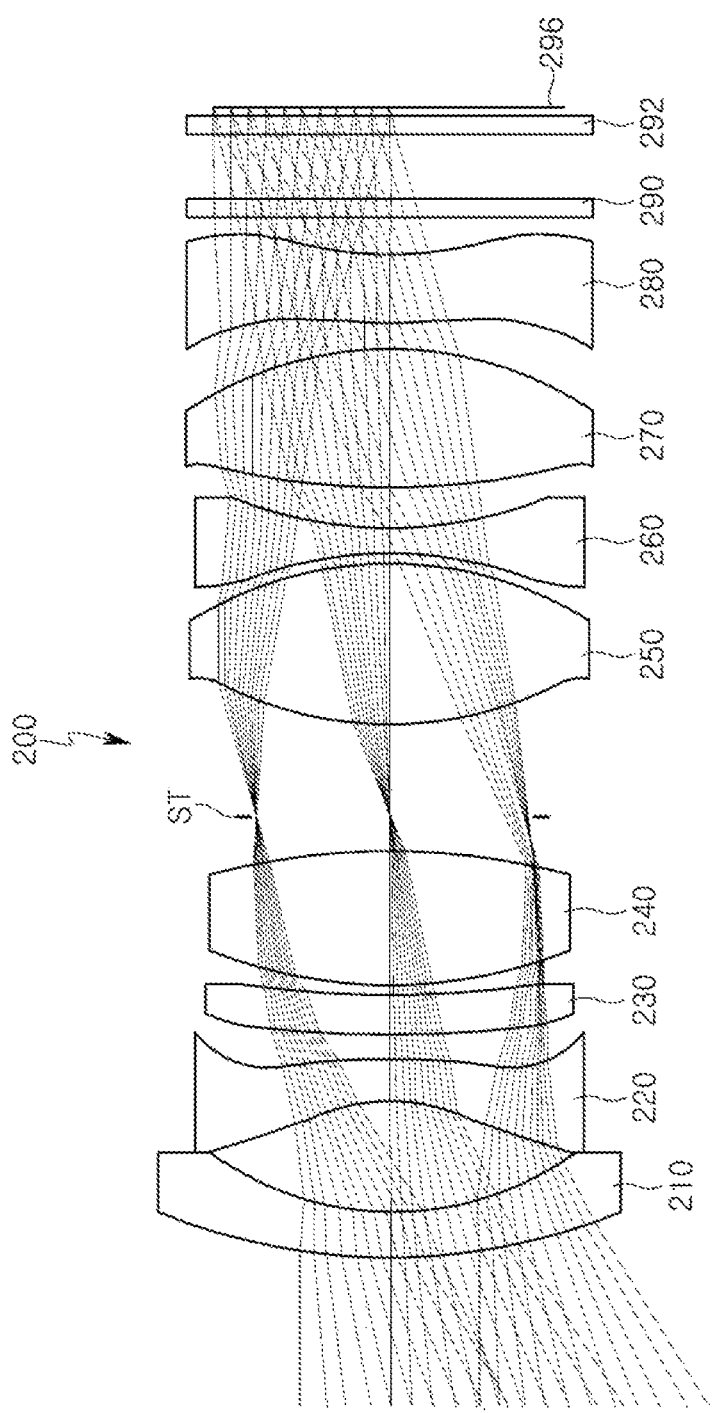
FIG. 3 illustrates a configuration of an image capturing lens system according to a second example.

Hereinafter, an image capturing lens system 200 according to a second example will be described with reference to FIG. 3.

A first lens 210 has negative refractive power, and has a convex object-side surface and a concave image-side surface. A second lens 220 has negative refractive power, and has a concave object-side surface and a convex image-side surface. A third lens 230 has negative refractive power, and has a convex object-side surface and a concave image-side surface. A fourth lens 240 has positive refractive power, and has a convex object-side surface and a convex image-side surface. A fifth lens 250 has positive refractive power, and has a convex object-side surface and a convex image-side surface. A sixth lens 260 has negative refractive power, and has a concave object-side surface and a concave image-side surface. A seventh lens 270 has positive refractive power, and has a convex object-side surface and a convex image-side surface. An eighth lens 280 has negative refractive power, and a convex object-side surface and a concave image-side surface. Inflection points are formed on the object-side surface and the image-side surface of the eighth lens 280.

The image capturing lens system 200 includes a lens, formed of a glass material, to perform constant optical performance in spite of temperature variation depending on an external environment. In the example of FIG. 3, the first lens 210 and the fourth lens 240 are formed of a glass material. Moreover, the image capturing lens system 200 includes a plurality of plastic lenses to reduce manufacturing costs and lightening a product weight. In the example of FIG. 3, the second lens 220, the third lens 230, and the fifth lens 250 to the eighth lens 280 are formed of a plastic material.

The image capturing lens system 200 includes a stop ST. The stop ST id disposed between the fourth lens 240 and the fifth lens 250. The image capturing lens system 200 includes filters 290 and 292 disposed between the eighth lens 280 and an imaging plane 296. The filters 290 and 292 may block infrared light and prevent contamination of the imaging plane caused by foreign objects.

The image capturing lens system 200 may have a predetermined field of view (FOV). For example, a total length TL of the image capturing lens system 200 may be 23.0 mm.

Table (2) lists lens characteristics of the image capturing lens system 200.

TABLE 2

| Surface No. | Note | Radius of Curvature | Thickness/ Distance | Refractive Index | Abbe No. | Focal Length |
|---|---|---|---|---|---|---|
| 1 | First | 12.0000 | 0.8500 | 1.772 | 49.0 | −16.5665 |
| 2 | Lens | 6.0000 | 2.2657 | | | |
| 3 | Second | −3.0000 | 0.8521 | 1.534 | 56.0 | −12.5966 |
| 4 | Lens | −5.9505 | 0.4668 | | | |
| 5 | Third | 39.9900 | 0.7925 | 1.640 | 23.0 | −345.9415 |
| 6 | Lens | 33.6101 | 0.2000 | | | |
| 7 | Fourth | 10.0026 | 2.7000 | 1.772 | 49.0 | 7.9894 |
| 8 | Lens | −14.1963 | 0.7000 | | | |
| 9 | Stop | infinity | 1.8000 | | | |
| 10 | Fifth | 6.8415 | 3.2591 | 1.534 | 56.0 | 6.9946 |
| 11 | Lens | −6.8622 | 0.2000 | | | |
| 12 | Sixth | −5.2588 | 0.5000 | 1.640 | 23.0 | −6.1976 |
| 13 | Lens | 16.7391 | 0.8070 | | | |
| 14 | Seventh | 9.9922 | 2.8000 | 1.535 | 56.0 | 6.8324 |
| 15 | Lens | −5.2009 | 0.5023 | | | |
| 16 | Eighth | 8.9720 | 1.3045 | 1.534 | 56.0 | −10.4770 |
| 17 | Lens | 3.2715 | 0.8000 | | | |
| 18 | First | infinity | 0.4000 | 1.517 | 64.0 | |
| 19 | Filter | infinity | 1.3000 | | | |
| 20 | Second | infinity | 0.4000 | 1.517 | 64.0 | |
| 21 | Filter | infinity | 0.0980 | | | |
| 22 | Imaging Plane | infinity | 0.0020 | | | |

Figure 4:
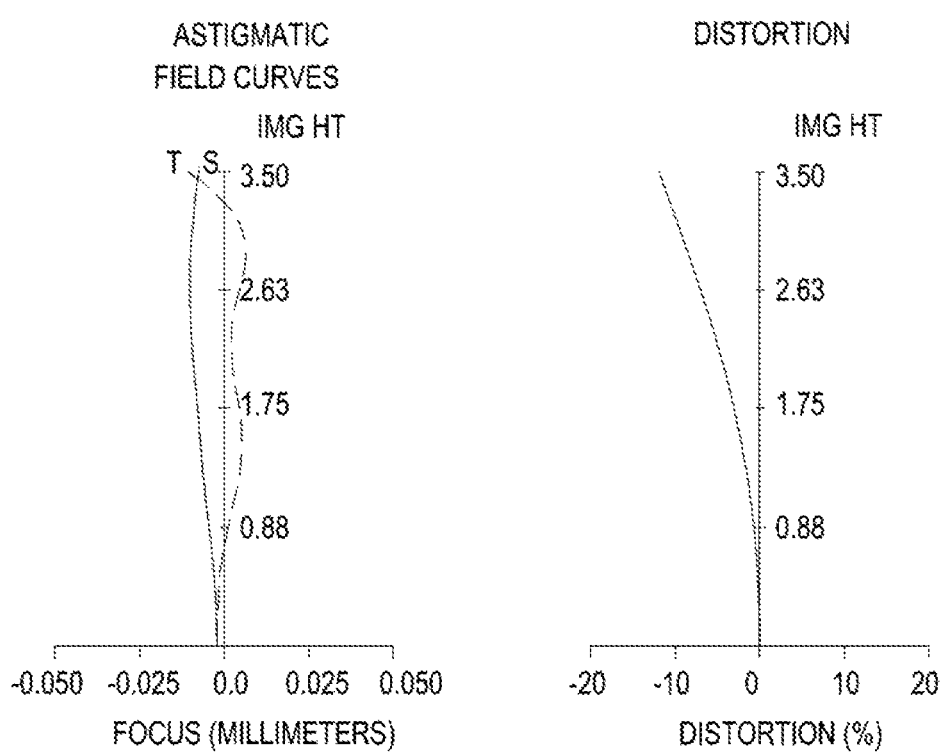
FIG. 4 shows aberration curves of the image capturing lens system illustrated in FIG. 3.

FIG. 4 illustrates aberration curves of the image capturing lens system 200.

Table (3) lists values of the Conditional Expressions of the first example and the second example.

TABLE 3

| Note | Conditional Expression | First Example | Second Example |
|---|---|---|---|
| 1 | F No | 1.650 | 1.650 |
| 2 | Nd6 | 1.640 | 1.640 |
| 3 | (Nd1 + Nd4)/2 | 1.772 | 1.772 |
| 4 | (Nd5 + Nd6 + Nd7 + Nd8)/4 | 1.561 | 1.561 |
| 5 | V1 | 49.0 | 49.0 |
| 6 | V3 | 23.0 | 23.0 |
| 7 | V2-V1 | 7.0 | 7.0 |
| 8 | V2-V3 | 33.0 | 33.0 |
| 9 | D23 < D12 | 2.325 | 1.799 |
| 10 | D45/D23 | 8.449 | 5.356 |

Hereinafter, a camera module 10 according to an example will be described with reference to FIG. 5.

Figure 5:
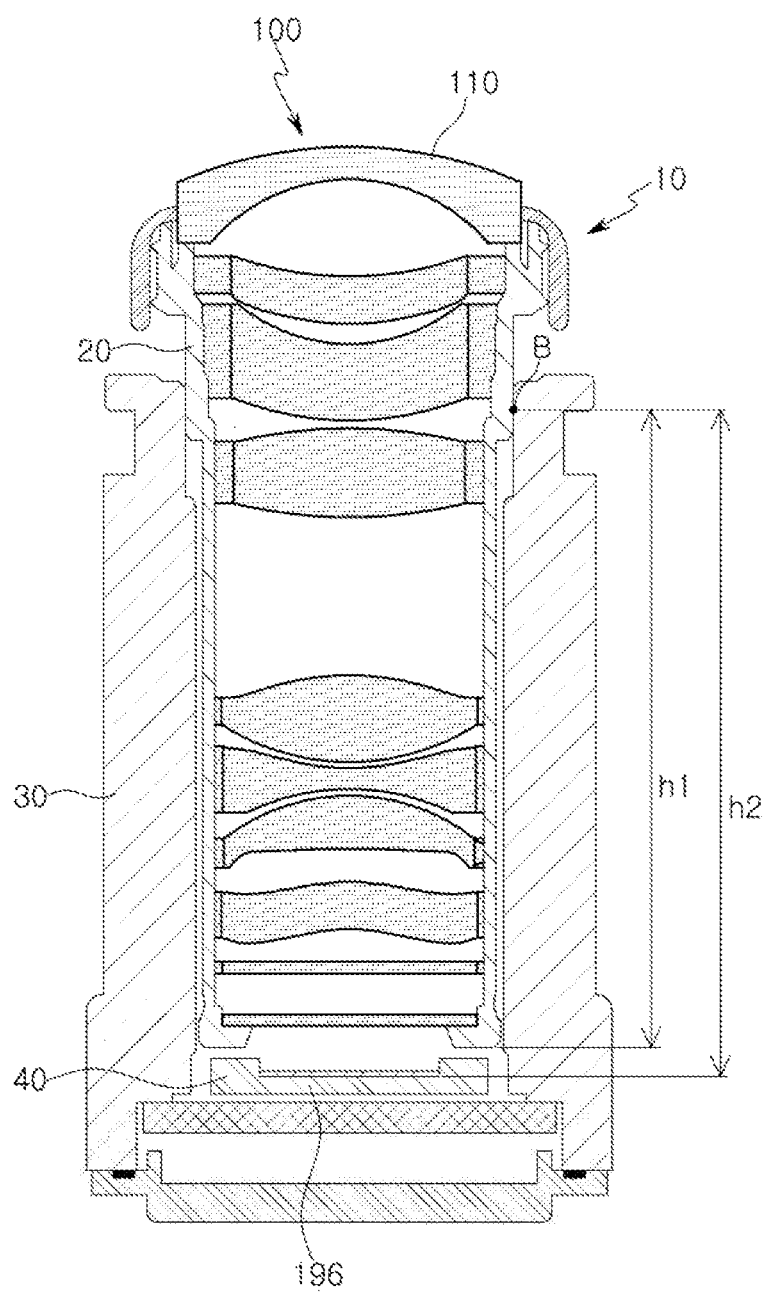
FIG. 5 is a cross-sectional view of a camera module including an image capturing lens system.

The camera module 10 includes one or more image capturing lens systems according to the above-described examples (for the reference, an image capturing lens system, illustrated in FIG. 5, has the configuration as the image capturing lens system 100 according to the first example). The camera module 10 is configured such that optical performance of an image capturing lens system is constantly maintained irrespective of temperature variations. For example, the camera module 10 includes a lens barrel 20 and a housing 30 having different coefficients of linear thermal expansion. The coefficient of linear thermal expansion of the lens barrel 20 is $2 \times 10^{-5}$ to $5 \times 10^{-5}$, and the coefficient of linear thermal expansion of the housing 30 is $2 \times 10^{-5}$ to $6 \times 10^{-5}$.

The camera module 10 is configured to separately accommodate a lens portion and the imaging plane (an image sensor) 196 of the image capturing lens system 100. For example, the lens portion of the image capturing lens system 100 is accommodated in the lens barrel 20, and the imaging plane 196 thereof is accommodated in the housing 30. The housing 30 may further include an additional substrate 40 to support the imaging plane 196.

A length of the lens barrel 20 may be determined in consideration of a variation in back focal length (BFL) of the image capturing lens system 100 depending on temperature variation. For example, a distance h1 from a bonding location of the lens barrel 20 and the housing 30 to a lower end of the lens barrel 20 may be determined in consideration of the BFL of the image capturing lens system 100, the coefficient of linear thermal expansion of the lens barrel 20, and the like. Alternatively, the distance h1 from the bonding location of the lens barrel 20 and the housing 30 to the lower end of the lens barrel 20 may be determined by a difference between the coefficients of linear thermal expansion of the lens barrel 20 and the housing 30.

Similarly, the bonding location of the lens barrel 20 and the housing 30 may be determined in consideration of a variation in the BFL of the image capturing lens system 100 depending on temperature variations. For example, a distance h2 from the bonding location to the imaging plane 196 may be determined in consideration of the BFL of the image capturing lens system 100, the coefficient of linear thermal expansion of the lens barrel 20, and the like. Alternatively, the distance h2 from the bonding location to the imaging plane 196 may be determined by the difference between the coefficients of linear thermal expansion of the lens barrel 20 and the housing 30.

As described above, an image capturing lens system according to the examples of the present disclosure may implement high-pixel and high-resolution images.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An image capturing lens system comprising:
   a first lens, a second lens having a concave object-side surface, a third lens having negative refractive power, a fourth lens, a fifth lens, a sixth lens having a refractive index less than 1.7, a seventh lens, and an eighth lens sequentially disposed from an object side of the image capturing lens system, wherein the first lens and the fourth lens are formed of a glass material, and the second lens, the third lens, the fifth lens, the sixth lens, the seventh lens, and the eighth lens are formed of a plastic material.

2. The image capturing lens system of claim 1, wherein the second lens comprises a convex image-side surface.

3. The image capturing lens system of claim 1, wherein the eighth lens comprises a convex object-side surface.

4. The image capturing lens system of claim 1, wherein the eighth lens comprises a concave image-side surface.

5. The image capturing lens system of claim 1, wherein the second lens has positive refractive power.

6. The image capturing lens system of claim 1, wherein the eighth lens has positive refractive power.

7. The image capturing lens system of claim 1, wherein the first lens has an Abbe number greater than 40, and the third lens has an Abbe number less than 30.

8. An image capturing lens system comprising:
a first lens having negative refractive power;
a second lens having positive refractive power;
a third lens having negative refractive power and having a convex image-side surface;
a fourth lens having positive refractive power;
a fifth lens having refractive power;
a sixth lens having refractive power and a refractive index less than 1.7;
a seventh lens having positive refractive power; and
an eighth lens having positive refractive power,
wherein the first to eighth lenses are sequentially disposed from an object side of the image capturing lens system.

9. The image capturing lens system of claim 8, wherein the fifth lens comprises a convex object-side surface or a convex image-side surface.

10. The image capturing lens system of claim 8, wherein the sixth lens comprises a concave object-side surface or a concave image-side surface.

11. The image capturing lens system of claim 8, wherein the seventh lens comprises a concave image-side surface.

12. The image capturing lens system of claim 8, wherein the eighth lens comprises a concave image-side surface.

13. The image capturing lens system of claim 8, further comprising:
a stop comprising an opening and disposed between the fourth lens and the fifth lens,
wherein a size of the opening is controlled to adjust an intensity of light incident on a side of the fifth lens.

14. An image capturing lens system comprising:
a first lens group comprising a first lens, a second lens having a concave object-side surface, a third lens, and a fourth lens sequentially disposed from an object side of the image capturing lens system;
a second lens group comprising a fifth lens, a sixth lens having negative refractive power, a seventh lens, and an eighth lens sequentially disposed from the object side of the image capturing lens system; and
a stop disposed between the first lens group and the second lens group,
wherein at least one of the lenses of the first lens group is formed of a glass material and all of the lenses of the second lens group are formed of a plastic material.

15. The image capturing lens system of claim 1, wherein $4 < D45/D23 < 10$, where D23 is a distance from an image-side surface of the second lens to an object-side surface of the third lens, and D45 is a distance from an image-side surface of the fourth lens to an object-side surface of the fifth lens.

* * * * *